(No Model.) 2 Sheets—Sheet 1.
R. R. GWATHMEY.
COTTON GIN.
No. 418,563. Patented Dec. 31, 1889.
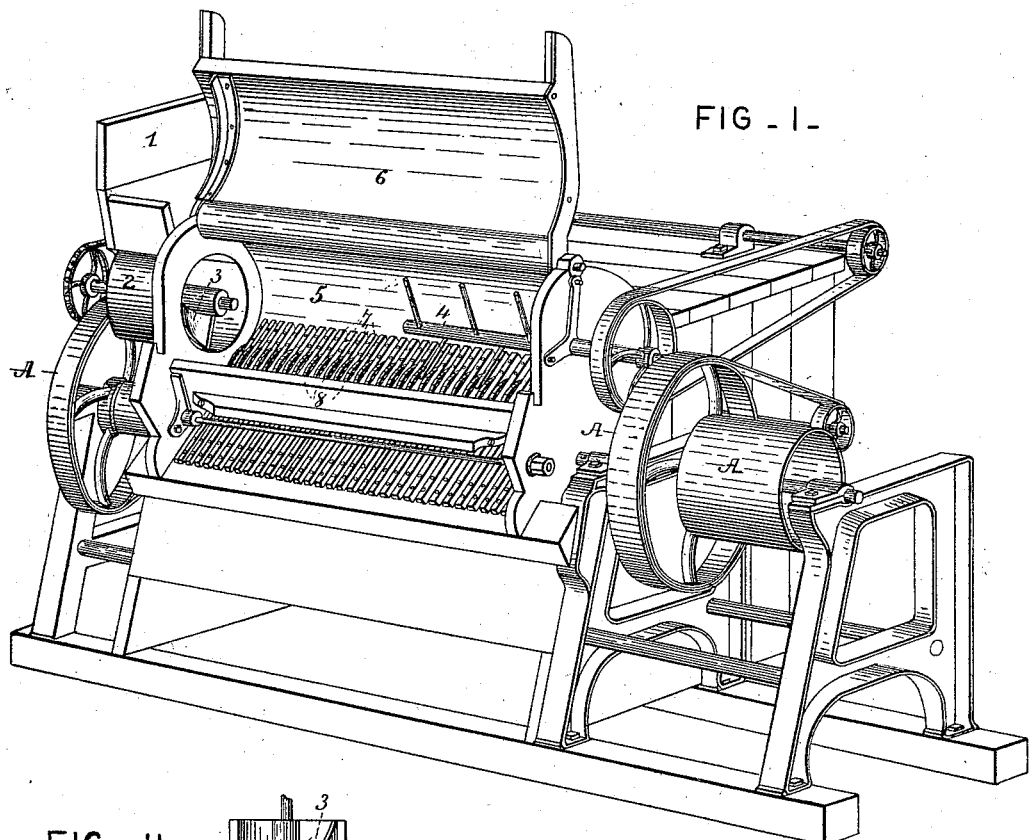
FIG - I -
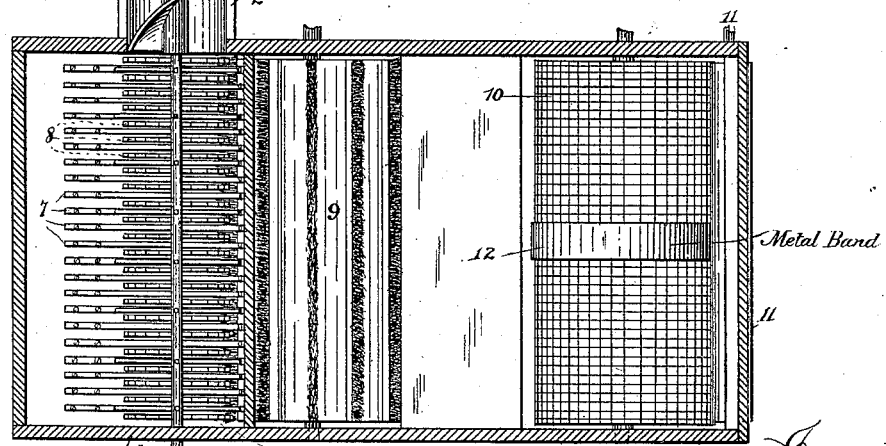
FIG - II -
Metal Band
Attest:
Geo. E. Cruse
E. Arthur
Inventor:
R. R. Gwathmey
by Knight Bros.
attys.

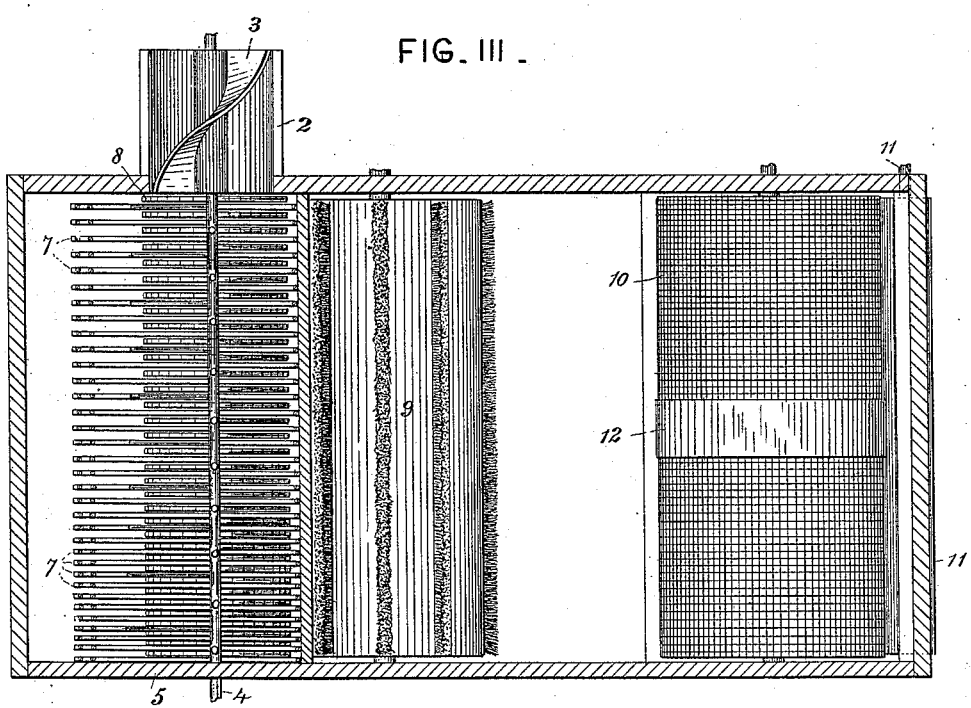

UNITED STATES PATENT OFFICE.

RICHARD R. GWATHMEY, OF NEW LONDON, CONNECTICUT.

COTTON-GIN.

SPECIFICATION forming part of Letters Patent No. 418,563, dated December 31, 1889.

Application filed February 18, 1889. Serial No. 300,323. (No model.)

*To all whom it may concern:*

Be it known that I, RICHARD R. GWATHMEY, a citizen of the United States, residing at New London, in the county of New London and State of Connecticut, have invented certain new and useful Improvements in Cotton-Gins, of which the following is a specification.

This invention relates to that class of cotton-gins known as "saw-gins," in which the cotton fibers are removed from the seed by means of saws projecting between the ribs; and it consists of an improved feed applied to an ordinary saw-gin and an improved condensing-roller used in connection therewith, whereby the material may be discharged in two or more grades of lint varying in the length of the fibers composing the same.

My invention consists, essentially, in the combination, with a saw-gin, of an end feed constructed of a suitable hopper, a barrel or trough, and a screw which is adapted to force the seed-cotton horizontally into the cotton-box at one end and keep it moving straight across the saws, which may be closer together at the tail end, until the seeds pass out at the opposite end. By this means it will be observed that the long fiber is first stripped from the blooms, then the shorter fiber, and finally the very short lint, which ordinarily is allowed to remain on the seed and is stripped therefrom in the oil-mills. With my present invention, however, it is found that the seed is completely stripped, thus admitting of no waste. When the material treated approaches the opposite end of the machine, the fiber has been so nearly stripped therefrom that it is found in practice necessary to provide the box with an agitator. In case the machine is to be used in oil-mills, where it is customary to lint the seed before using it for the purposes of producing oil, it is advisable that the agitator should be continued throughout the length of the cotton-box, the seeds passing away at the tail end of the machine in the usual manner. In connection with the gin thus separating the long from the short fibers I use a condensing-roll provided with one or more separating-bands of metal, which prevent the material from taking hold or clinging to the said roll at that point, and therefore delivers the condensed wadding in two or more grades.

In order that my invention may be more fully understood, I will describe it with reference to the accompanying drawings, in which—

Figure I is a perspective view of my improved cotton-gin. Fig. II is a section through the upper part of the box and above the condensing-roll, showing the modification in the gin as adapted for a linter and the means of separating the condensed fiber. Fig. III is a similar view, on an enlarged scale, showing the saws as set closer together at the tail end.

A may represent any suitable form of driving-gear for the machine.

1 represents the hopper; 2, the barrel or trough; 3, the screw feed-conveyer, and 4 the agitator, which preferably has radial arms.

5 represents the cotton-box, having hinged cover 6 and ribs 7. Between these ribs project the saws 8, which are carried by a suitable shaft in the usual manner.

9 represents the strippers, and 10 11 the condensing-rolls, the former 10 of which is provided with the metallic strip 12. When the fiber comes in contact with the condensing-roll 10, to be passed forward thereby, and between the outer rolls 11 for compressing it, it does not adhere to the metallic band 12, but is drawn by the currents of air to one side or the other with the fiber which adheres to the rough surface of the roller. Thus the fiber may be delivered in two, three, or more portions by providing one, two, or more separating-strips on the roller. It will be seen that the conveyer-trough and hopper supported by the same may be attached to the end of the cotton-box in a manner to cover the opening of the same. The agitator may be formed by a continuation of the conveyer-shaft and be driven from either end, or the conveyer and agitator may be located at opposite ends of the cotton-box and driven by independent mechanism.

In feeding the cotton into my machine at the hopper it is caught by the revolving screw, rolled around, and projected forward and into the cotton-box with a slight rotary movement. The first saws with which the material comes in contact strip the blooms of all the long fiber, then passing on to the next the shorter fiber is removed, and so on, until reaching the other end of the machine, when the seeds are so well stripped that only the short lint remains, when, by the aid of the agitator, the seeds are acted upon by the remaining saws and more completely stripped than has heretofore been possible in machines of ordinary construction.

The modified form shown in Fig. 2, in which the agitator is continued across the machine, is intended for use in oil-mills, and in this instance it may be desirable to do away with the peculiar form of condensing-rolls. Thus my machine is of great and peculiar advantage, in that it affords a great saving of valuable material which would otherwise be wasted and produces separation of the material in the condenser.

Having thus described my invention, the following is what I claim as new therein and desire to secure by Letters Patent:

1. In combination with the cotton-box of a cotton-gin, a horizontal screw-conveyer feeder communicating horizontally with the end thereof, substantially as and for the purpose explained.

2. The combination, with the cotton-box of a saw-gin, of the shaft carrying the arms within said box, a screw conveyer without one end of said box, also mounted on said shaft and feeding horizontally into the box, a suitable trough for said conveyer, and a hopper above the trough, for the purposes herein explained.

3. In a cotton gin or linter, the combination of a cotton-box having a number of saws, an end feed for projecting the material to be treated into the box at one end and passing it through to the other, suitable strippers, and a condenser divided into two or more parts, substantially as and for the purposes explained.

4. In a cotton gin or linter, the combination of the hopper, the trough, screw conveyer, cotton-box, saws, stripper, and condenser having the metallic dividing strip or strips, all substantially as and for the purpose set forth.

5. A condensing-roll divided into a number of cylindrical parts, as and for the purpose explained.

6. A condensing-roll having one or more smooth bands for dividing its surface, substantially as and for the purpose explained.

7. A condensing-roll provided with one or more circumferential metallic bands for dividing the roll into two or more parts, for the purpose explained.

RICHARD R. GWATHMEY.

Witnesses:
EDWARD T. BROWN,
GEORGE COLFAX.